Oct. 12, 1954     C. H. FRICK     2,691,382
GOVERNOR WITH SELF-FLUID PRESSURE OVERRIDE MEANS
Filed Nov. 28, 1952
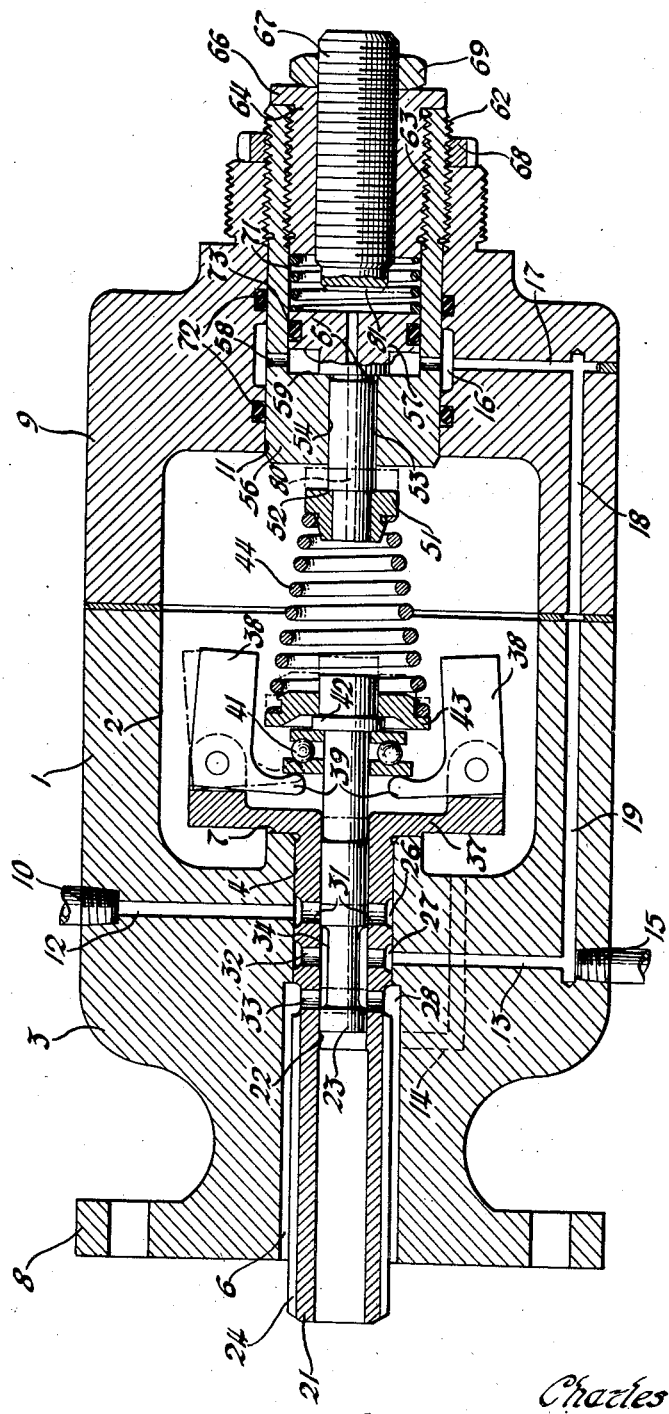
Inventor
Charles H. Frick
By
Willits, Helwig & Baillio
Attorneys

Patented Oct. 12, 1954

2,691,382

UNITED STATES PATENT OFFICE 2,691,382

GOVERNOR WITH SELF-FLUID PRESSURE OVERRIDE MEANS

Charles H. Frick, Pontiac, Mich., assignor to General Motors Corporation, Detroit, Mich., a corporation of Delaware Application November 28, 1952, Serial No. 322,857

9 Claims. (Cl. 137—53)

This invention relates to governors and particularly to such devices for controlling the delivery of pressure fluid to a fluid actuated means in response to speed of a driven member.

While the invention is particularly applicable to controlling the operation of clutches, for example clutches in a lock-up drive for a converter type fluid transmission where it is desired that the converter input speed effective to engage the lock-up clutch be greater than the speed at which the clutch is disengaged, the invention is not limited to such applications but is believed to have many other uses unrelated to transmissions.

In its broader aspects the object of the invention is to employ a speed sensitive governor operable against a biasing means to shift a valve controlling the flow of a pressure fluid, wherein the valve is effective in its high speed position to reduce the force of said biasing means and is operable in its low speed position to increase the force of the biasing means.

A further and more specific object of the invention is to provide such a device for controlling the flow of pressure fluid in which the force of the biasing means may be adjusted to vary the governor driving speeds at which the pressure fluid flow is established and cut off respectively.

A further object of the invention is to provide such a pressure fluid flow controlling governor in the form of a compact self-contained unit having relatively few parts of simple and inexpensive design.

The means by which these and other objects of the invention are obtained will be more readily apparent from the following description, having reference to the attached drawing showing a longitudinal sectional view of one preferred embodiment of my device.

In the drawing the numeral 1 indicates a housing forming an enclosure 2 and having an end wall 3 which is provided with a bore 4. This bore terminates at its outer end in an enlargement 6 and at its opposite end in a thrust face 7. An apertured flange 8 is shown provided on the end wall 3 by which the housing may be mounted to an engine or other rotary power transmitting means not shown. The opposite end of the housing from the end wall 3 is closed by a housing cover 9 which is provided with a bore 11 which is prefarbly aligned with the housing bore 4.

The housing is shown provided with a pressure fluid supply passage 12 extending from a fluid inlet 10 to the bore 4 and a fluid delivery passage 13 extends from the bore 4 to a fluid outlet 15. These passages 12 and 13 intersect the bore 4 at points spaced from each other longitudinally of said bore. The interior of the housing may be vented as shown by a passage 14 provided in the end wall 3 and terminating in the enlargement 6. The bore 11 in the cover 9 is provided with a wide annular groove 16 which is in continuous communication with the housing delivery passage 13 via connecting passages 17 and 18 in the cover and a passage 19 in the housing 1.

Rotatably journalled in the housing bore 4 is a driven member having a hollow shaft portion 21 whose internal surface 22 forms a bore slidably and rotatably fitting a slide valve 23. The shaft portion 21 is shown extending beyond the flange 8 and provided with external splines 24 for engagement with a suitable driving member. The outer periphery of the shaft portion adjacent the splines 24 is formed with three longitudinally spaced annular grooves 26, 27 and 28 which communicate respectively with the supply passage 12, delivery passage 13 and the enlargement 6 which forms a vent passage. Extending transversely through the wall of the shaft portion and connecting the bore 22 thereof with these annular grooves are one or more ports 31, 32 and 33, respectively. The valve 23 has its peripheral surface facing the bore 22 relieved intermediate the ends of the valve by an annular groove 34 of sufficient length to provide communication between the ports 32 and either the ports 31 or the ports 33, but of insufficient length to permit communication between the ports 31 and the ports 33. In its position shown in solid lines in the drawing the ports 32 and 33 are connected by the valve groove 34, and the ports 31 are closed. In this position the annular groove 16 in the cover 9 and the passages 17, 18, 19 and 13 are thus vented to the bore enlargement 6. In the broken line position of the valve shown in the drawing the vent ports 33 are closed and pressure fluid in the supply passage 12 may flow through the delivery passage 13, both to the pressure fluid outlet 15 and to the annular groove 16 in the housing cover.

Within the housing enclosure 2 the driven member 21 terminates in a flange 37 which thrustably abuts the surface 7 of the housing end wall and has pivotally mounted thereon one or more inwardly and outwardly swingable weights 38 each having an arm 39 which acts against a thrust bearing indicated generally at 41 to urge the valve 23 toward the cover 9 during rotation of the shaft portion 21. The thrust bearing 41 is in abutment with a collar 42 on the valve and engaging the opposite side of this collar is a washer 43 connected to one end of a compression spring 44 which serves as a yieldable biasing means urging the valve to its venting position and opposing outward swinging movements of the weights 38. As shown, the spring 44 is in the form of a conically shaped coil which provides a varying deflection rate.

At its opposite end the spring 44 has a movable reaction member in the form of a washer 51 abutting a shoulder 52 of a piston rod 53 slidably mounted in the bore 54 formed in the end wall of a cup-shaped member 56. This cup-shaped member 56 forms a cylinder bore for a piston 57 on the rod 53, and the bore of this cylinder is in continuous communication with the annular groove 16 in the cover through one or more transverse ports 58 extending through the side wall of the cup-shaped member. The internal surface 59 at the bottom end of this cup-shaped member forms a stop engageable by a shoulder 61 formed on the rod 53 to limit the movement of the piston inwardly of the cup-shaped member. Adjacent its outer end the side walls of the cup-shaped member are externally and internally threaded as at 62 and 63 to adjustably engage an internally threaded end of the cover bore 11 and an externally threaded sleeve 64 respectively. The outer end of this sleeve 64 is provided with an integral flange 66 which is drawn up to clampingly abut the outer end of the cup-shaped member 56 and thereby locate these parts longitudinally of each other, and the bore of the sleeve is internally threaded to adjustably locate a second stop member in the form of a stud 67 which serves to limit movement of the piston in its direction away from the first stop 59. The interior of the cup-shaped member 54 between the piston and the sleeve 64 is suitably vented, preferably to the interior of the housing 1, as by an axial passage 80 extending through the piston and its rod 53 and a cross slot 81 provided in the inner end face of the stud 67. Lock nuts 68 and 69 respectively are provided for securing the adjusted positions of the cup-shaped member relative to the housing 9 and the stud 67. Means biasing the piston against the stop 59 is provided in the form of a coil compression spring 71 having a greater force than the conical spring 44. One end of this spring 71 abuts the piston 57 and the other end abuts the inner end of the sleeve 64. Suitable packings in the form of resiliently compressible O-section rings 72 and 73 are provided for sealing the bore 11 of the housing cover to the cup-shaped member on opposite sides of the annular groove 16, and for sealing the bore of the cup-shaped member against leakage of oil past the piston.

In operation, when the parts are in their full line positions shown in the drawing, the spring 71 holds the piston 57 against the stop 59 in its external lefthand position, and the conical spring 44 opposes outward movement of the weights in response to rotation of the shaft 21. Flow of pressure fluid from the inlet 10 through the supply passage 12 to the delivery passage 13 is blocked by the valve, and the passages 13, 17, 18, 19 and the bore of the cup-shaped member 56 are all vented to the outlet passage formed by the housing bore enlargement 6. When the rotating speed of the shaft 21 reaches a sufficiently high value that the weights will swing outward to their broken line positions in opposition to this biasing force of the spring 44, the valve 23 simultaneously shifts to its broken line position, connecting the fluid supply port 12 to both the outlet 15 and the bore of the cup-shaped member 56. The fluid thereupon entering the cup-shaped member drives the piston to the right against the second stop 67 in opposition to the spring 71. This causes the biasing force of the spring 44 to be relieved, with the result that the weights 38 do not swing inwardly to return the valve to the venting position until the shaft reaches a slower rotating speed than the maximum speed thereof at which the weights previously maintained the valve in its venting position. Thus, a speed governed control is obtained of the pressure fluid flow from the inlet 10 to the outlet 15 whereby such flow is established at a relatively higher speed than that at which the flow is interrupted.

Among the numerous constructional and functional advantages of my governor are the use of a hydraulic actuated piston assembly acting directly against the governor speeder spring 44 to differentially relate the operating speeds at which the valve is shifted from its venting position to its pressure fluid delivery position and from the latter position to the former. This arrangement results in a considerable reduction in the number of parts as compared with prior art governors of like purpose. Also, the use of two threaded members 56 and 57 to determine the respective valve shifting speeds enables obtaining a wide range of adjustment of the shifting speeds with a governor speeder spring of selected design.

It is appreciated that many alterations in the structure and arrangement of the parts from those of the specific embodiment herein disclosed will readily suggest themselves to persons skilled in the art. Such alterations are considered to come within the scope of my invention to the extent they are embraced by the following claims.

I claim:

1. In a pressure fluid flow controlling means, a housing having pressure fluid supply, delivery and vent passages, a valve movable in said housing to connect said delivery passage alternatively with said supply passage and said vent passage, a first resilient member biasing said valve to a position connecting said delivery and vent passages, a driven member, a valve shifting member connected to the driven member for movement in opposite directions in accordance with increasing and decreasing speed of said driven member, respectively, and operatively connected to said valve for moving said valve in opposition to said first resilient member to a position connecting said delivery and supply passages in response to increased speed of said driven member, a reaction member for said first resilient member movable in opposite directions to increase and decrease the biasing force of said first resilient member, first and second stops limiting the range of movement of said reaction member, and means for moving said reaction member between said stops including a second resilient member biasing said reaction member in the direction toward said first stop to increase the biasing force of said first resilient member, an abutment for said second resilient member, a fluid pressure cylinder communicating with said delivery passage, and a piston in said cylinder, said reaction member being connected to said piston for movement thereby toward said second stop in opposition to said second resilient member upon the admission of pressure fluid to said cylinder.

2. The invention set forth in claim 1, wherein said first stop is adjustable relative to said housing to vary the maximum biasing force of said first resilient member on said valve when said reaction member is engaged with said first stop.

3. The invention set forth in claim 1, wherein said second stop is adjustable relative to said housing to vary the minimum biasing forces of said first resilient member on said valve when said reaction member is engaged with said second stop.

4. The invention set forth in claim 1 wherein said first and second stops are adjustable relative to both said housing and to each other to vary the maximum biasing force of said first resilient member on said valve when said reaction member is engaged with said first stop relative to said minimum biasing force when said reaction member is engaged with said second stop.

5. In a pressure fluid flow controlling means, a housing having an end wall provided with a bore extending into the housing interior, a cover for the housing having a bore axially aligned with said housing bore, said housing having respective pressure fluid supply, delivery and vent passages communicating separately with said housing bore, a rotatively driven member including a shaft portion journalled in said housing bore and a portion within the housing interior having a weight pivoted thereto for outward swinging movement in response to rotation of said shaft portion, said shaft portion having an axial bore with side ports spaced longitudinally therealong and communicating with said housing bore in connecting relation with said supply, delivery and vent passages, respectively, a valve slidably fitting said shaft bore and having a peripheral groove registering continuously with said delivery passage connected port and alternatively with one of said other ports, said valve being connected to the weight for movement thereby into registry with said supply passage connected port in response to outward swinging movement of the weight, an outwardly presenting cup-shaped member adjustably slidable in said cover bore and forming a fluid pressure cylinder in continuous communication with said delivery passage, a piston slidably mounted in said cup-shaped member and movable in the direction outwardly thereof under pressure of fluid in said supply passage, stop means limiting movement of the piston inwardly and outwardly of said cup-shaped member, said outwardly limiting stop means being adjustable longitudinally of said cup bore, a first spring interposed between said valve and said piston tending to maintain said valve in registry with said vent connected port and said piston in abutment with said outwardly limiting stop means, and a second spring operating against said piston in opposition to said first spring, said second spring being yieldable under the combined force of said first spring and of the supply pressure acting on the piston but having sufficient stiffness to overcome said first spring when said supply passage is closed by the valve.

6. In a governor for controlling the flow of a pressure fluid, an inlet and an outlet for the pressure fluid, a valve movable between positions blocking and accommodating pressure fluid flow between said inlet and outlet, a rotatively driven member carrying a centrifugally movable weight, said weight having a connection with the valve operative to move the valve to its flow accommodating position in response to centrifugal movement of the weight, a speeder spring biasing the valve to its flow blocking position and resiliently opposing centrifugal movement of the weight, a piston operatively supporting the speeder spring and movable in opposite directions to increase and decrease its biasing force on the valve, a second spring of greater stiffness than the speeder spring and biasing the piston in the direction to increase said speeder spring biasing force, an operating cylinder for said piston in fluid communication with the outlet side of the valve, said second spring being yieldable under the fluid pressure acting on the piston when said valve is in its flow accommodating position.

7. In a centrifugal governor having a flyweight arranged to open a valve in a fluid pressure delivery passage in opposition to a speeder spring tending to close the valve, the improvement consisting of a piston supporting the speeder spring and means for moving the piston in opposite directions to increase and decrease the valve closing force of the speeder spring, said means including a stop limiting movement of the piston in its direction increasing the speeder spring force, an operating cylinder for the piston in communication with the passage below the valve, and a second spring of greater stiffness than the speeder spring urging the piston against stop but yieldable under the force of the fluid pressure acting on the piston when the valve is open.

8. In a centrifugal governor for controlling the operation of a fluid actuated device, fluid pressure passage means, a valve movable to close and open said passage means to the flow of fluid, a rotatively driven flyweight movable centrifugally in response to its increased rotating speed and having a connection with the valve operative to open the valve in response to centrifugal movement of said weight, means thrustably biasing the valve closed and yieldably opposing its opening movement by the flyweight, a fluid pressure responsive member providing thrust reaction for said biasing means and movable by fluid pressure in a direction to decrease the thrust imposed on said valve by said biasing means, said pressure responsive member being in fluid communication below the valve with said passage means, and other biasing means urging said pressure responsive member in the opposite direction, said other biasing means being effective to overcome said first named biasing means when the valve is closed but yieldable under the fluid pressure force acting on said pressure responsive member when the valve is open.

9. In a pressure fluid flow controlling device, pressure fluid passage means, a valve movable to open and close said passage means to the flow of fluid, a valve shifting member movable in opposite directions and having a connection with the valve operative during movement of said shifting member in one direction to open the valve, resilient means biasing said valve closed and acting through said connection to urge said shifting member in the other of said opposite directions, a fluid pressure responsive member providing a reaction for said resilient means and movable by fluid pressure in a direction to decrease the biasing force of said resilient means, said pressure responsive member being in fluid communication below the valve with said passage means, and other resilient means biasing said fluid pressure responsive member in a direction to increase the biasing force of said first named resilient means, said other resilient means being effective to overcome said first named resilient means when the valve is closed but yieldable under the fluid pressure force acting on said pressure responsive member when the valve is open.

References Cited in the file of this patent

UNITED STATES PATENTS

| Number | Name | Date |
|---|---|---|
| 1,205,127 | Herr | Nov. 14, 1916 |
| 2,114,221 | Gillett | Apr. 12, 1938 |
| 2,494,630 | Richmond | Jan. 17, 1950 |